US012343690B2

(12) United States Patent
Dahan et al.

(10) Patent No.: US 12,343,690 B2
(45) Date of Patent: Jul. 1, 2025

(54) MIXING DEVICE AND MIXING TAP SYSTEM

(71) Applicant: UNITO SMART TECHNOLOGIES LIMITED, Tsuen Wan (HK)

(72) Inventors: Yuval-Yoni Dahan, Rishon LeTzion (IL); Abraham Dahan, Rishon LeTzion (IL)

(73) Assignee: UNITO SMART TECHNOLOGIES LIMITED, Tsuen Wan NT (HK)

( * ) Notice: Subject to any disclaimer, the term of this patent is extended or adjusted under 35 U.S.C. 154(b) by 175 days.

(21) Appl. No.: 17/945,927

(22) Filed: Sep. 15, 2022

(65) Prior Publication Data

US 2023/0084742 A1 Mar. 16, 2023

(30) Foreign Application Priority Data

Sep. 16, 2021 (EP) .................................... 21197126

(51) Int. Cl.
*B67D 1/00* (2006.01)
*B01F 23/236* (2022.01)
(Continued)

(52) U.S. Cl.
CPC ............ *B01F 25/30* (2022.01); *B01F 23/236* (2022.01); *B01F 23/45* (2022.01); *B67D 1/0052* (2013.01); *B01F 2101/14* (2022.01)

(58) Field of Classification Search
CPC .. B67D 1/0888; B67D 1/0857; B67D 1/0895; B67D 1/0021; B67D 1/0044; B67D 1/0046
(Continued)

(56) References Cited

U.S. PATENT DOCUMENTS 4,211,342 A * 7/1980 Jamgochian .......... G07F 13/065 222/129.4
5,186,363 A 2/1993 Haynes
(Continued)

FOREIGN PATENT DOCUMENTS

EP 3760795 A1 1/2021
GB 962559 A 7/1964

OTHER PUBLICATIONS

European Patent Application No. EP 21197126.2, Extended European Search Report mailed Mar. 3, 2022, 16 pages.

*Primary Examiner* — Charles P. Cheyney
(74) *Attorney, Agent, or Firm* — Kilpatrick Townsend & Stockton LLP

(57) ABSTRACT

A mixing device for mixing at least two different types of liquids of different ingredients suitable for being placed within a tap spout, preferably at a spout outlet, comprising at least two inlets configured to receive the liquids. The mixing device is adapted to deliver liquids separately at the same time such that the liquids mix at an outlet of the mixing device. The mixing device may further comprise a mixing space adapted to mix the liquids received at the inlets and deliver the mixture of the liquids, or deliver one type of liquid through the mixing space when only one type of liquid is received at the inlets, at the outlet of the mixing device. Each of the inlets is connected to a respective conduit that is fluidly separated from the other conduits. The present invention further relates to mixing tap systems using such a mixing device.

9 Claims, 15 Drawing Sheets

Detail G

Figure 1A:
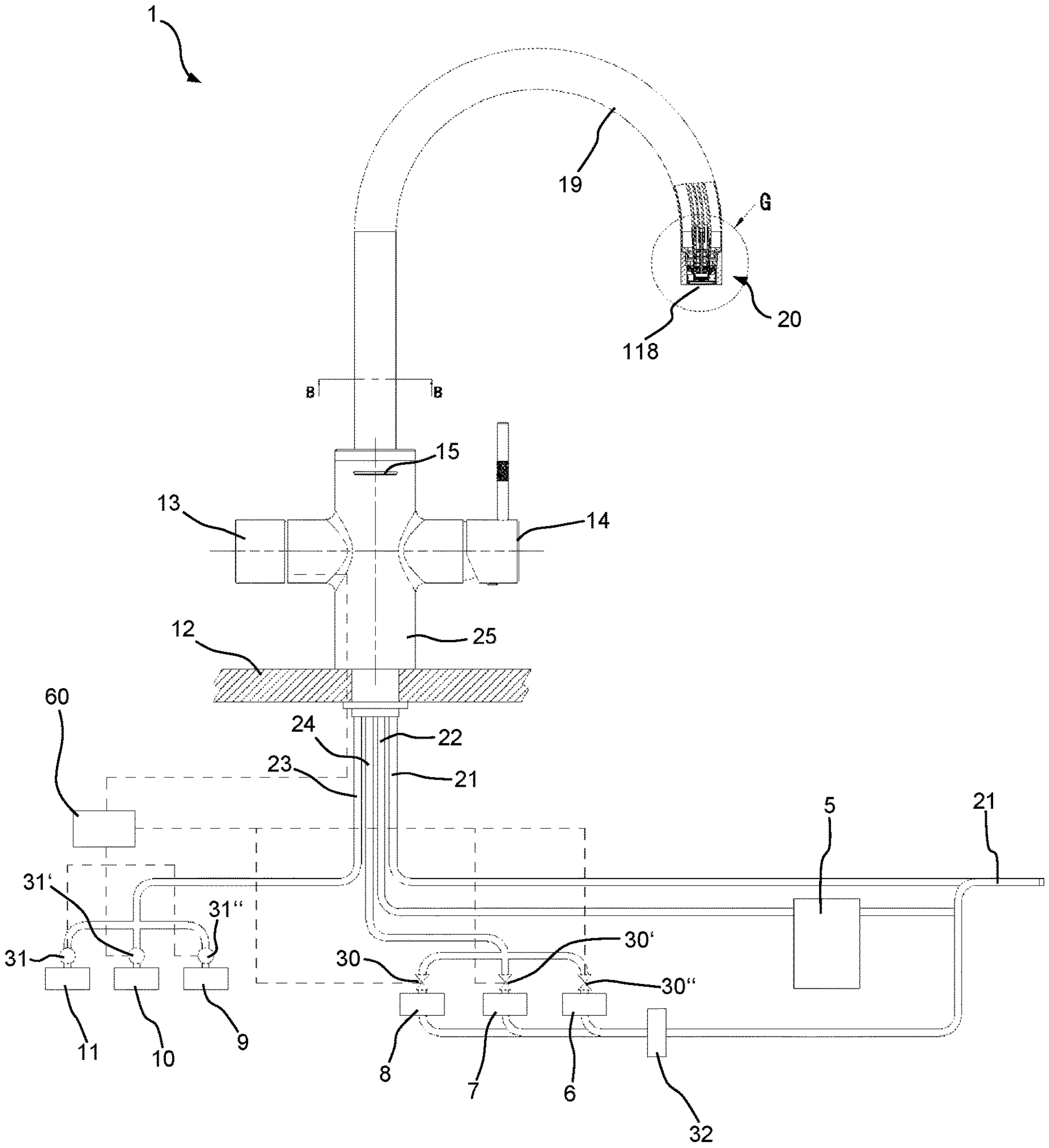

(51) Int. Cl.
*B01F 23/45* (2022.01)
*B01F 25/30* (2022.01)
*B01F 101/14* (2022.01)

(58) Field of Classification Search
USPC ........... 99/275, 290; 222/129.1, 146.1, 129.4
See application file for complete search history.

(56) References Cited

U.S. PATENT DOCUMENTS

| | | | | | |
|---|---|---|---|---|---|
| 5,975,365 | A * | 11/1999 | Hsieh | A47J 31/40 222/146.6 |
| 6,669,053 | B1 * | 12/2003 | Garson | B67D 1/1281 222/61 |
| 9,821,992 | B2 * | 11/2017 | Rudick | B67D 1/07 |
| 10,407,292 | B2 * | 9/2019 | Hecht | G07F 13/065 |
| 10,654,700 | B2 * | 5/2020 | Hecht | B67D 1/06 |
| 10,730,735 | B2 * | 8/2020 | Cook | B67D 1/1204 |
| 10,918,238 | B2 * | 2/2021 | Bhutani | A47J 31/402 |
| 2005/0121466 | A1 * | 6/2005 | Sher | B67D 1/005 222/129.1 |
| 2009/0120958 | A1 | 5/2009 | Anders et al. | |
| 2014/0305967 | A1 | 10/2014 | Hecht | |
| 2018/0072557 | A1 * | 3/2018 | Bertness | B01F 33/848 |
| 2018/0117606 | A1 | 5/2018 | Bertness et al. | |
| 2019/0002264 | A1 * | 1/2019 | Madden | B67D 1/0021 |
| 2019/0270630 | A1 | 9/2019 | Dahan et al. | |
| 2022/0024748 | A1 * | 1/2022 | Fantappie | B67D 1/0078 |
| 2022/0169490 | A1 * | 6/2022 | Moran | A47J 31/54 |

* cited by examiner

Detail G

Section B-B

Detail F

Section B-B

Section C-C

Section H-H

Section J-J

Section O-O

Section P-P

Section M-M

Section N-N

MIXING DEVICE AND MIXING TAP SYSTEM

CROSS-REFERENCE TO PRIORITY APPLICATIONS

This application claims priority to European Patent Application No. EP 21197126.2, filed Sep. 16, 2021, the entirety of which is incorporated by reference herein.

DESCRIPTION

The present invention relates to a mixing device for mixing at least two different types of liquids of different ingredients suitable for being placed within a tap spout, preferably at a spout outlet.

There is increasing demand for consuming healthy drinks including filtered water, and beverages prepared at home, controlling the ingredient's health characteristic beverages and concentration. Those systems are expected to be eco-friendly, e.g. preventing single-use plastic bottles to reduce the impact on the environment, improving satisfaction (wide selection choice, desired taste, easy to operate) and health, promoting wellness, while minimizing the space occupied on a countertop or worktop or in the kitchen.

The domestic beverages systems known are mostly stand-alone systems positioned on the kitchen countertop or the kitchen floor. Few of the beverage dispenser solutions are integrated into the standard kitchen tap mounted on the countertop without significantly increasing its outer dimensions.

Standalone beverage systems for drinking liquids and beverages are limited in size to minimize the space occupied. The dispensing apparatus may include a replaceable water bottle stored in or an external source of water supply is connected to the system in the kitchen or in some cases even requires alternatively an additional faucet mounted on the countertop.

Build-in beverage systems utilize kitchen taps or mixing kitchen taps (including a mixer for mixing line water) for delivering in addition to the line water, drinking liquids, or beverages.

Kitchen mixing taps are mostly designed to deliver hot and cold line water mixed in a mixing valve build-in the tap body for receiving the water at the temperature and flow rate required. Most of the mixing kitchen taps comprise an aerator at the end of the spout to aerate the delivered water and arranging the flow out of the tap. The beverage tap dispensers come to solve the major drawback of the traditional stand-alone dispensing systems, as they all take valuable countertop or kitchen space, and few of them require water tank charging or line water and drain pipes connections.

Limited solution options for dispensing beverages in addition to the traditional filtered and non-filtered water supply exist. Those beverage dispensers mostly require the pre-mix beverage stored in a storage or mixed in a mixing arrangement positioned before the tap entry, for delivering the ready mixed beverages to the tap inlet. (pre-mixed beverages). The aerator positioned at the end of the spout presents an additional challenge when using existing taps and aerators. The existing mixing devices and mixing tap systems used for beverage dispensing suffer many disadvantages.

Thus, an additional tap for dispensing the drinking liquids beside the tap for line water supply is necessary. The optional selection of the delivered beverages is limited. Furthermore, a beverage concentration cannot be suitably controlled, mainly due to the limitation of the existing tap structure and a limited spout area (diameter) that limit number of supply conduits. Moreover, in existing systems there is a need for an aerator at the end of the spout, which presents another challenge for delivering liquids with taste in addition to pure filtered water and line water. Furthermore, each of the fluids should be isolated to prevent contamination of the pure water and odour left on pipes. Pre-mixed beverages are also not regarded as ideal, for example in terms of freshness and hygiene.

It is therefore an object of the present invention to provide a mixing device and a mixing tap system, which overcome the drawbacks of existing solutions, configured to deliver line water, pure drinking liquids, additive liquids, and mixed liquids mixed on the flow for supplying a fresh beverages mixture and keeping the fresh taste of the mixture delivered.

According to a first aspect, the object of the present invention is solved by a mixing device for mixing at least two different types of liquids of different ingredients suitable for being placed within a tap spout, preferably at a spout outlet, comprising at least two inlets configured to receive the liquids, wherein the mixing device is adapted to deliver liquids separately at the same time such that the liquids mix at an outlet of the mixing device and/or wherein the mixing device further comprises a first mixing space that is adapted to mix the liquids received at the inlets and to deliver the mixture of the liquids, or to deliver one type of liquid through the first mixing space when only one type of liquid is received at the inlets, at the outlet of the mixing device, wherein each of the at least two inlets is connected to a respective conduit that is fluidly separated from the other conduits.

Hence, the mixing device may mix water with an additive, such as syrup or tea, wherein the liquids are delivered strictly separately through the conduits so that the properties, e.g. temperature, taste etc., of a mixed beverage are not changed throughout their supply line. Furthermore, this makes it possible to avoid contamination problems of the conduits, especially the conduit supplying pure water. Of course, if only one liquid is delivered to the first mixing space, the delivered liquid passes through the first mixing space and is delivered from the tap as supplied to the first mixing space.

The mixing device may comprise three inlets configured to receive three different types of liquids, wherein the mixing device is adapted to deliver at least two of the liquids separately at the same time such that the liquids mix at the outlet of the mixing device and/or wherein the mixing device is adapted to mix two of the liquids in the first mixing space and to deliver the mixture of the liquids, or to deliver one type of liquid through the first mixing space when only one type of liquid is received at the inlets, at the outlet of the mixing device and to deliver at the outlet of the mixing device one liquid unmixed bypassing the first mixing space. Doing so, a mixture, as described above, and an unmixed liquid may be delivered from a tap one at a time or at the same time such that they mix in a drinking vessel, like a cup.

As an alternative or in addition, the mixing device may comprise four inlets, wherein at least three of the inlets are suitable for receiving three different types of liquids and an additional inlet is suitable for receiving air, wherein the mixing device is adapted to deliver at least two of the liquids separately at the same time such that the liquids mix at the outlet of the mixing device and/or wherein the mixing device further comprises a second mixing space fluidly and/or mechanically connected to the first mixing space and the mixing device is adapted to mix at least two of the liquids in the first mixing space and to deliver the mixture of the liquids, or to deliver one type of liquid through the first mixing space when only one type of liquid is received at the inlets, and to deliver at the outlet of the mixing device one liquid unmixed bypassing the first mixing space, wherein the mixing device is further adapted to mix the mixture of liquids or single liquid delivered from the first mixing space and/or the unmixed liquid bypassing the first mixing space with air in the second mixing space. A degree of air mixed into the liquid and/or mixture may be adjusted at the mixing device. The air inlet into the mixing device may be arranged at an opposite side of the mixing device with respect to the other three inlets for liquids. The air inlet may be realized as an annular space that is surrounding the outlet for the mixed or unmixed liquid. This may use the effect that air is automatically pulled through the air inlet and into the liquid when liquid is delivered via the outlet of the mixing device.

The second mixing space may be divided in two fluidly separated second mixing subspaces, the first of which is adapted to mix the mixture of liquids or single liquid delivered from the first mixing space with air and the second of which is adapted to mix the unmixed liquid bypassing the first mixing space with air. This way, either the unmixed liquid, e.g. the line water of a predetermined temperature, and/or the drinking liquid(s) can be mixed with air. By dividing the second mixing space into two separated subspaces, it can be ensured that no undesired mixing of the unmixed liquid bypassing the first mixing space with drinking liquid and/or additive liquid occurs.

A mixing device according to above configurations configured is capable of handling different, preferably three, separated liquid passages (line water, drinking liquids, and additive liquids) and still aerate at least the line water. Preferably, an integrated mixing arrangement for mixing liquids and an additional mixing arrangement for mixing air in a liquid is comprised. Hence, the mixing device may be divided into two stages for easy sanitizing.

According to a second aspect the object of the present invention is solved by a mixing tap system, comprising

- a tap with a tap base, a tap housing and a tap spout, wherein at least two inlet conduits are connected to the tap base, wherein:
  - the first conduit is configured to supply at least one drinking liquid to the tap base from at least one drinking liquid supplying device, and
  - the second conduit is configured to supply at least one additive liquid to the tap base from at least one additive liquid supplying device,
- a first, preferably electronic, operating member and/or a user interface configured to select and operate at least one, preferably electronic, valve and/or at least one pump positioned between the tap base and the supplying devices for opening and closing any individual selected valve and/or operating any individual selected pump for delivering at least one of the drinking liquids and/or at least one of the additive liquids;
- the tap spout, comprising at least first and second internal conduits running within the tap that are fluidly separated from each other for delivering the isolated additive liquids and drinking liquids; and
- a second mixing device being a mixing device according to the present invention, wherein each of the at least two inlets is connected to a respective one of the internal conduits, wherein the second mixing device is arranged in the vicinity of the outlet end of the tap spout (the spout outlet) at which the liquid or mixture of liquids is dispensed.

The mixing tap systems according to the second aspect provides an advanced solution over existing systems by providing a fresh supply of beverages mixed on delivery, adding the option for delivering beverages in addition to the option of delivering line water and drinking liquids in separated passages as well as increasing the delivery selection type of drinking liquids and beverages, by selecting the mix on demand. For example, if there are provided three types of drinking liquid storages (e.g. chilled water, boiling water, sparkle water) and two types of additive liquid storages (i.e. five storages in total), there may be provided nine different types of non-mixed drinking liquids and mixed liquids (three types of non-mixed drinking liquids and six types of mixed drinking liquids).

Furthermore, any contamination of the pure drinking water delivered in the separated passage may be prevented by the mixing tap systems according to the second aspect, and an option for delivering pure non-mixed additive liquids for mixing with liquids that are not available in the system storages selection is provided (e.g. a mix with alcoholic liquid).

Using a mixing device at the spout outlet allows the use of a thin internal conduit to deliver additives in a small quantity. The state of the art way of delivering premixed beverages requires conduits with a larger diameter to obtain an adequate flow rate. This is a limitation in taps currently used. Especially, if two or three premixed beverages shall be delivered, the conduits are impossible to be implemented due to their required diameter, which is usually between 4 mm to 7 mm.

In contrast to that, an additive liquid conduit according to the present invention may have an inner (free) diameter of 2 mm to 3 mm. A drinking liquid conduit may have an inner diameter of approximately 4 mm to 7 mm. Hence, the internal conduit for additive liquid may be smaller than all other internal conduits.

Overall, fresh mixed liquids for delivering a better beverage taste experience as well as a wider selection range of drinking liquids selection, additive liquids and mixed liquids for providing beverages may be provided.

A tap of the tap systems disclosed may preferably be a kitchen tap, but is not limited to the application within a kitchen, even if referred to as "kitchen" tap throughout this description. The present invention further has the advantage that the tap system, especially as a kitchen tap, may have standard dimensions as known from regular state of the art taps. Therefore, the inventive mixing tap system can be used with standard sinks and may also be used as a retrofit in existing systems, e.g. a standard tap may simply be replaced by the inventive mixing tap system without the necessity of replacing the sink and/or without taking more space on the kitchen counter. In its basic form, the mixing tap system according to the second aspect may be disconnected from a direct supply of line water but may only be supplied by liquids from the supplying devices. Of course, the supplying devices may then be connected to a water main.

In a similar manner, "a liquid" may comprise all kinds of beverages, e.g. water, syrup, flavored water, tee or the like, is however not limited to above examples of beverages.

The stored drinking liquids may be held pressurized under the pressure of the water main line. Opening any of the valves positioned at the outlets of the dinking liquid supplying devices will result in a flow of the drinking liquid out of the corresponding supplying device. Since the additive liquid supplying devices are not pressurized, pumps are needed to supply at least one additive liquid to the tap base.

The mixing tap system may further comprise:

- a third inlet conduit connected to the tap base, wherein the third conduit is configured to supply to the tap base non-filtered hot line water or cold line water or mixed hot and cold line water mixed by a first mixing device that is configured to mix hot and cold line water for obtaining line water at a desired temperature, wherein the first mixing device is operated by a second, preferably mechanical, operating member configured to deliver hot line water, cold line water, or the obtained mixture of hot and cold line water; and
- the tap spout, comprising a third internal conduit running within the tap that is fluidly separated from the others for delivering the hot line water or the cold line water or the mixed hot and cold line water.

Here, the mixing tap system may comprise an external water mixing device (as the first mixing device) that mixes cold and hot water to deliver water at a desired temperature to the mixing tap system and through it to the mixing device arranged at the spout outlet. Thus, only one conduit for line water is needed, since the line water is supplied to the tap base at the desired temperature from the external water mixing device.

The mixing tap system may further comprise:

- the third inlet conduit connected to the tap base, wherein the third conduit is configured to supply to the tap base one of non-filtered hot line water and cold line water;
- a fourth inlet conduit connected to the tap base, wherein the fourth conduit is configured to supply to the tap base the other one of non-filtered hot line water and cold line water;
- a first mixing device that is configured to mix hot and cold line water for obtaining line water at a desired temperature, wherein the first mixing device is operated by a second, preferably mechanical, operating member configured to deliver hot line water, cold line water, or the obtained mixture of hot and cold line water, wherein the mixture of hot and cold line water is delivered to the mixing device via a third internal conduit running within the tap that is fluidly separated from the others.

In a preferred embodiment of the present invention, the mixing arrangement may be positioned in or at the tap base. This may be performed by a simple manual valve arrangement that is adapted to increase a flow rate of cold water and at the same time decrease a flow rate of hot water, or vice versa.

The mixing tap system may further comprise a control unit electrically connected to the first operating member and configured to control an operation of the first operating member and/or the at least one valve and/or the at least one pump, wherein the control unit is preferably adapted to control a concentration of mixture delivered by controlling the flow rate or volume amount of each of the selected liquids, preferably wherein the control unit is configured to activate the at least one pump positioned between the at least one liquid supplying device and the tap base to pump out the additive liquid required for a limited time to control the additive type and/or a delivered quantity for receiving the at least one drinking liquid and/or the additives mixture at a proportion amount required on each delivery for controlling a mixture concentration. The control unit may be, for example, a knob that can be rotated and pressed and/or pulled to select and adjust a volume amount of a specific liquid. Hence, by the control unit, a concentration control for each delivery may be provided by controlling an amount of additive liquid delivered to be mixed with drinking liquid.

The pump for delivering at least one of the additive liquids may further be suitable to return additive liquid remaining in the conduit back to the supply device and/or a storage thereof. This is advantageous in terms of freshness and an amount of consumption, since no additive liquid is remaining in the conduit.

Through the tap, at least two of the internal conduits are running from the tap base through the tap to the second mixing device in parallel or in a concentric manner. A concentric arrangement may be advantageous if a flow rate of a liquid that is supplied through the conduit in the very middle is not exceeding a predetermined maximum flow rate. In case that two liquids have to be delivered at approximately the same flow rate, a parallel arrangement of two conduits may be preferred.

The internal conduits within the tap spout may be flexible. This makes it possible to move, for example pivot, the end of the tap spout that holds the second mixing device with respect to the rest of the tap spout. Hence, the direction of the liquid flow that is leaving the spout outlet of the tap spout can be manipulated. It shall be noted that the feature of the internal conduits being flexible is independent from the arrangement of the internal conduits through the tap spout (parallel/concentric), as mentioned above.

The inner flexible hose may be fixed with respect to the spout and may be terminating at a tip of the spout with a nozzle.

The inner flexible hose may be capable of being pulled out with respect to the spout such that a hose end is extended out the spout tip.

A flexible hose of a so-called "pull-out" spout has the advantage that more space can be reached with it and a containment such as a glass or a bottle, in which the liquid coming out of the spout is to be filled, has not to be positioned exactly beneath the spout in one fixed position, but can rather be varied by pulling out the "pull-out" spout via the flexible hose.

The inner flexible hose may be provided with a ballast element for pulling the hose back to its normal position inside the spout after having pulled it out from the spout and having left it free.

Figure 1B:
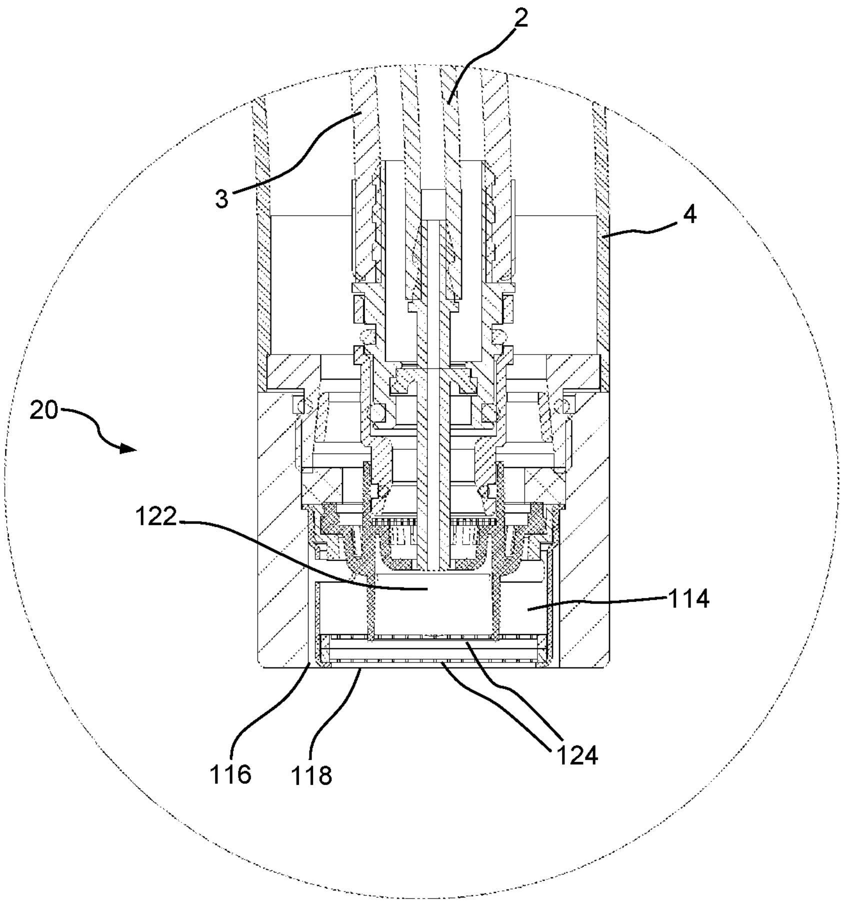

Preferred embodiments of the present invention will now be described in more detail with respect to the accompanying drawings, in which:

FIG. 1*a* is a schematic view of a mixing tap system according to an embodiment of the present invention, FIG. 1*b* is a detailed view of detail G in FIG. 1*a,*

Figure 1C:
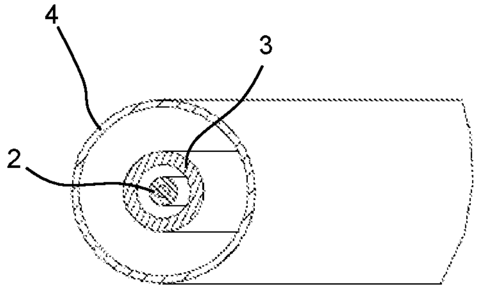

FIG. 1*c* is a perspective, cross-sectional view taken along line B-B in FIG. 1*a,*

Figure 2A:
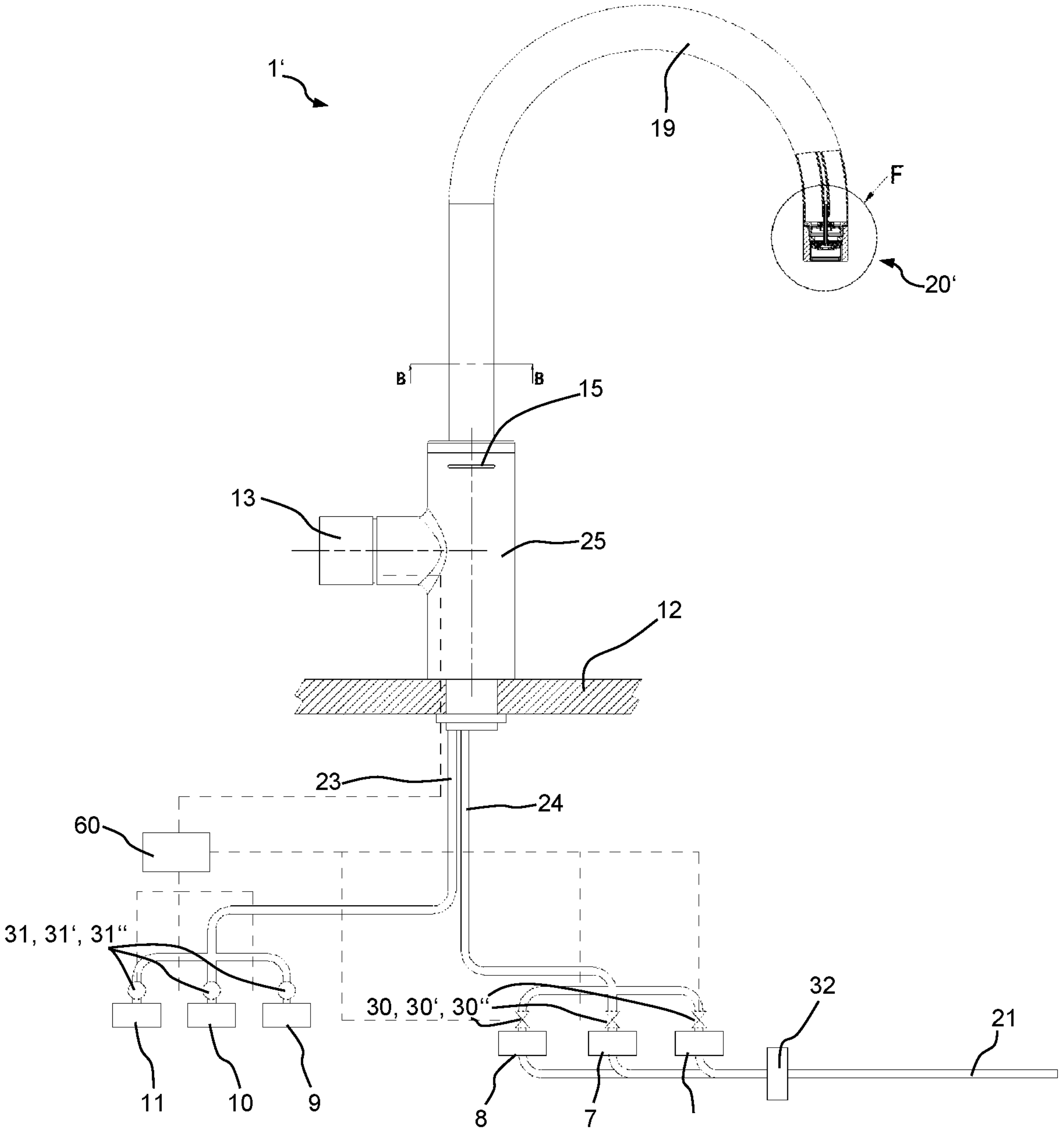
Figure 2B:
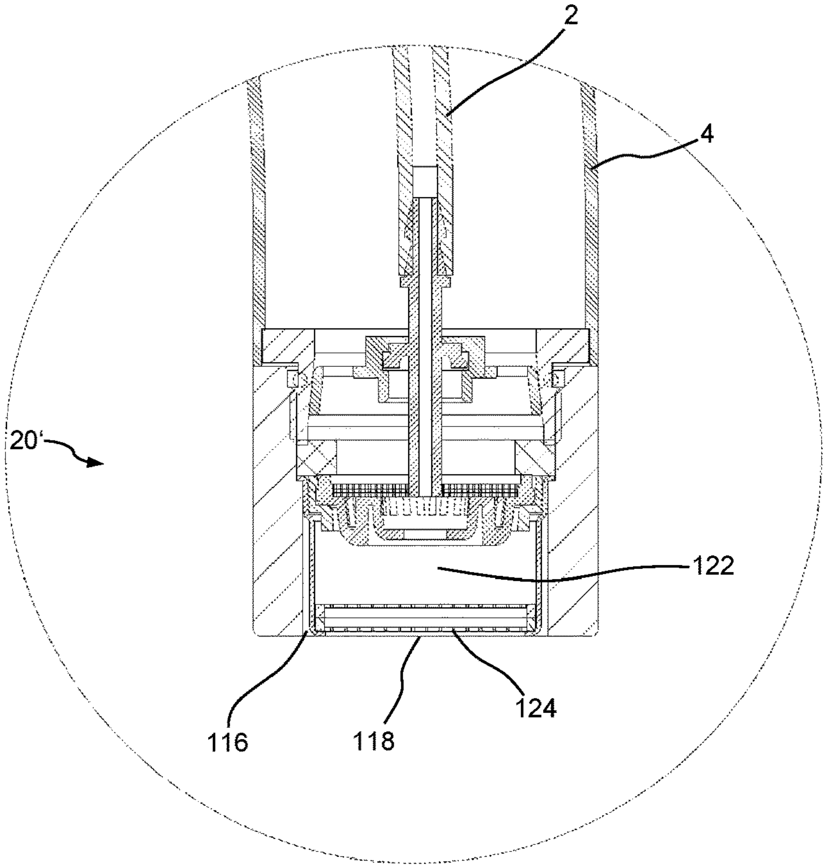

FIG. 2*a* is schematic view of a mixing tap system according to another embodiment of the present invention, FIG. 2*b* is a detailed view of detail F in FIG. 2*a,*

Figure 2C:
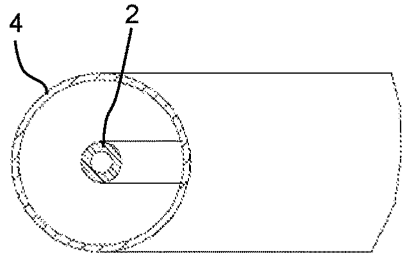

FIG. 2*c* is a perspective, cross-sectional view taken along line B-B in FIG. 2*a,*

Figure 3A:
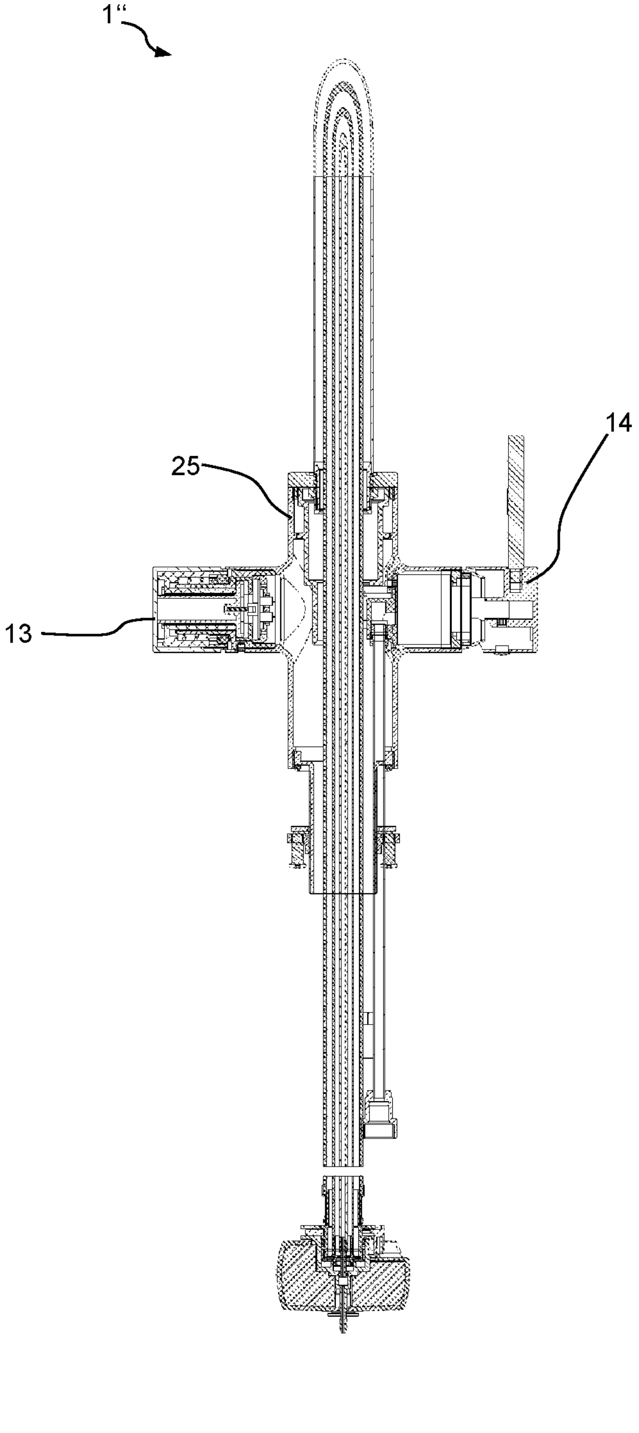
Figure 3B:
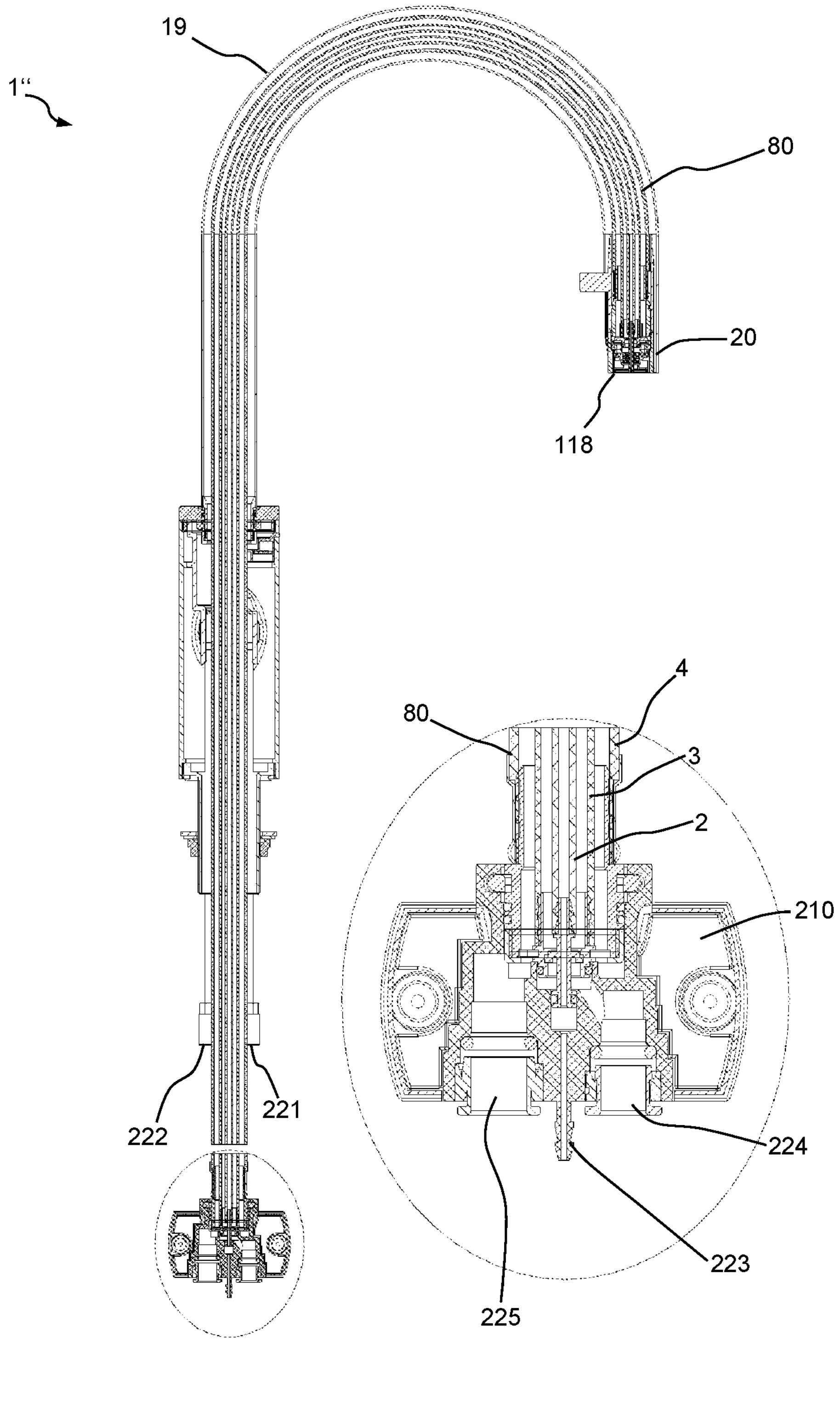
Figure 4A:
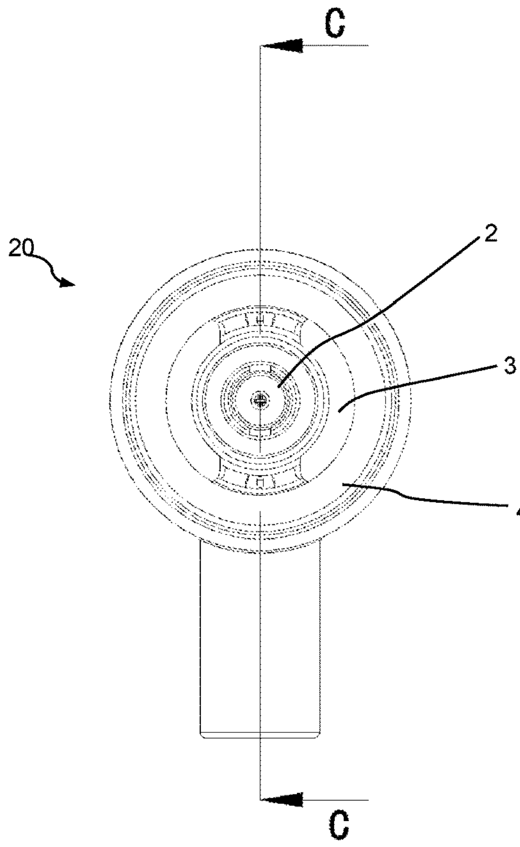
Figure 4B:
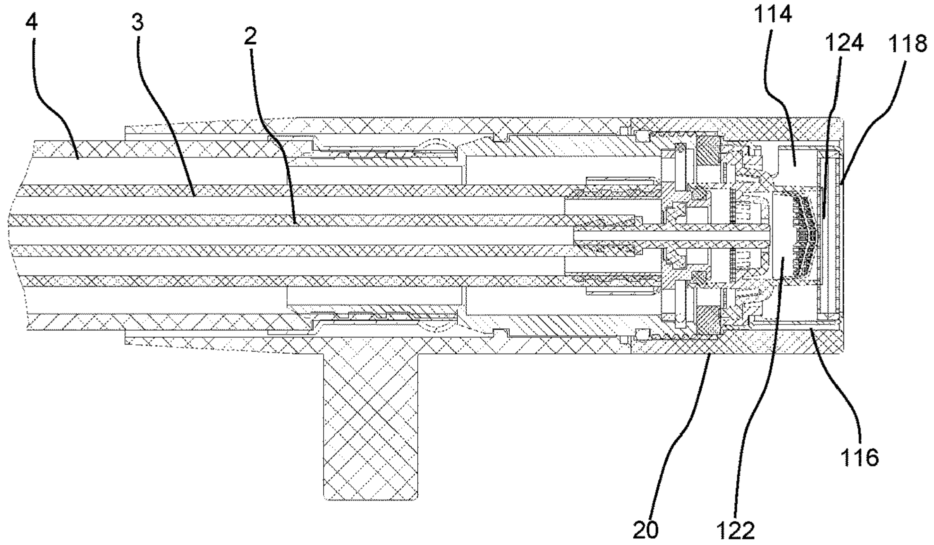

FIG. 3*a* is a cross-sectional view of a tap with a pull-out spout according to a further embodiment of the present invention, FIG. 3*b* is cross-sectional view from another angle of the tap of FIG. 3*a* and a detailed view of an inlet connection to a pull out conduit entry, FIG. 4*a* is a bottom view of a mixing device according to another embodiment of the present invention, FIG. 4*b* is a cross-sectional view taken along line C-C in FIG. 4*a,*

Figure 4C:
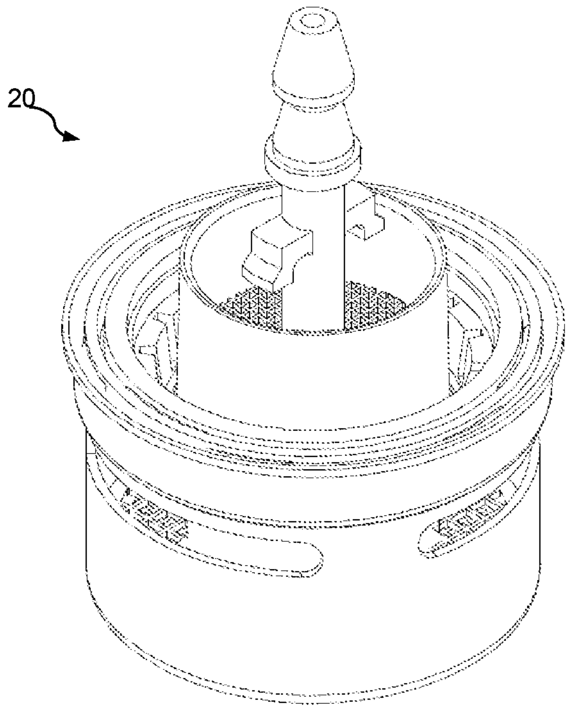
Figure 4D:
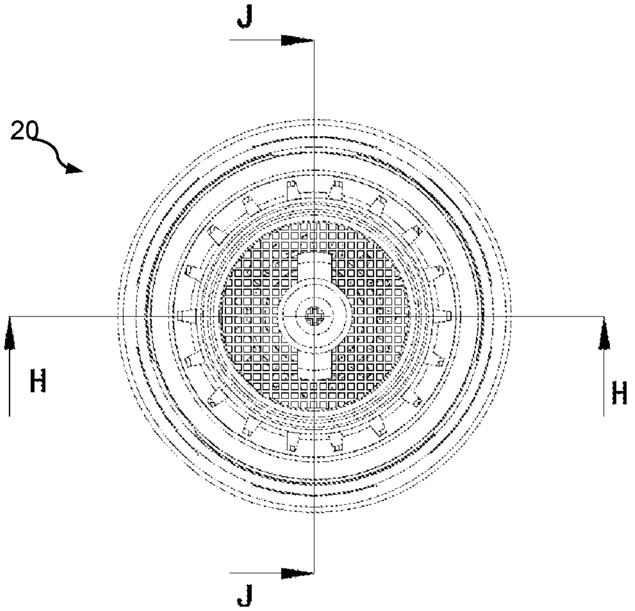
Figure 4E:
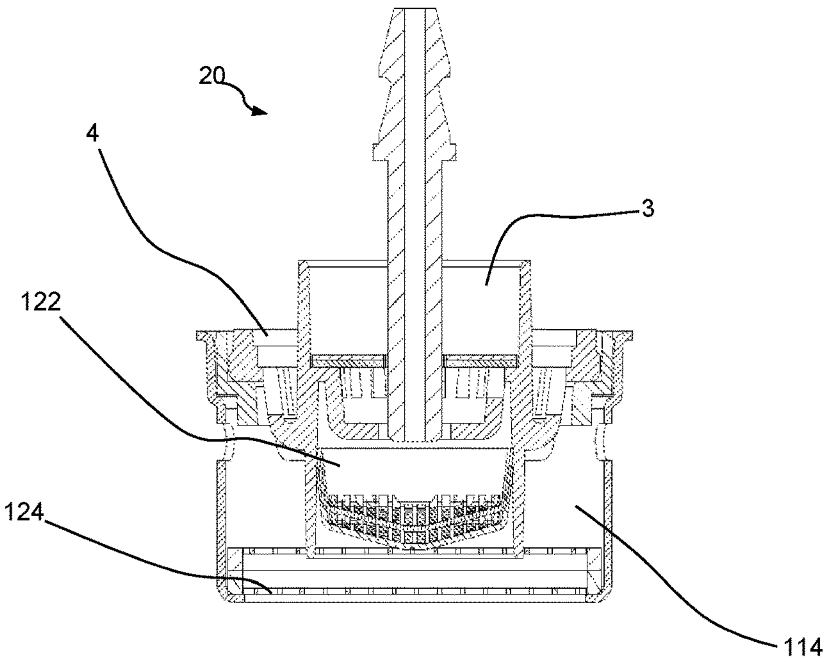
Figure 4F:
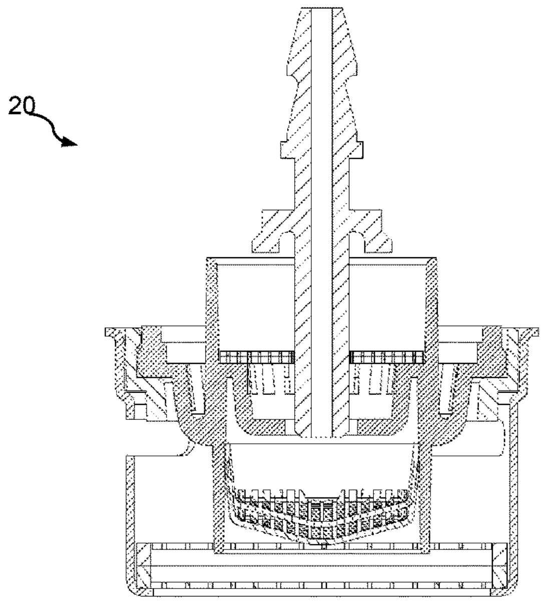
Figure 5A:
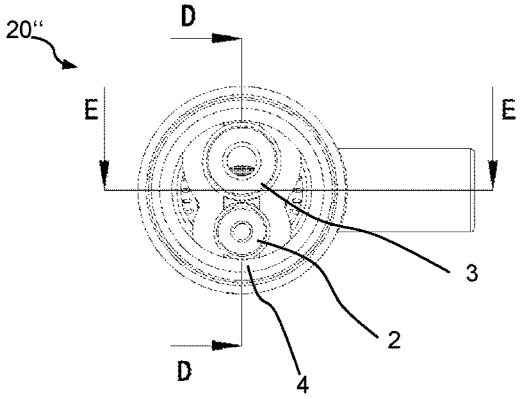
Figure 5B:
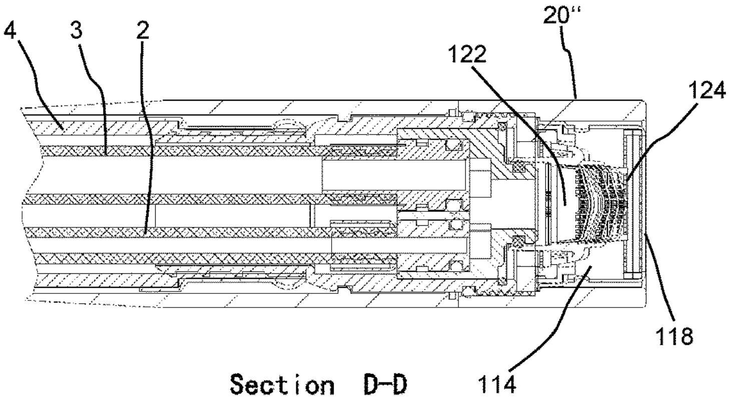
Figure 5C:
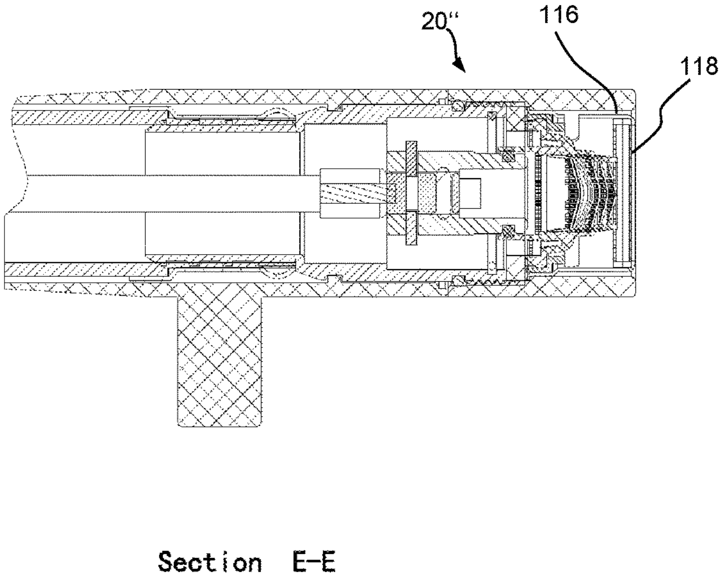
Figure 5D:
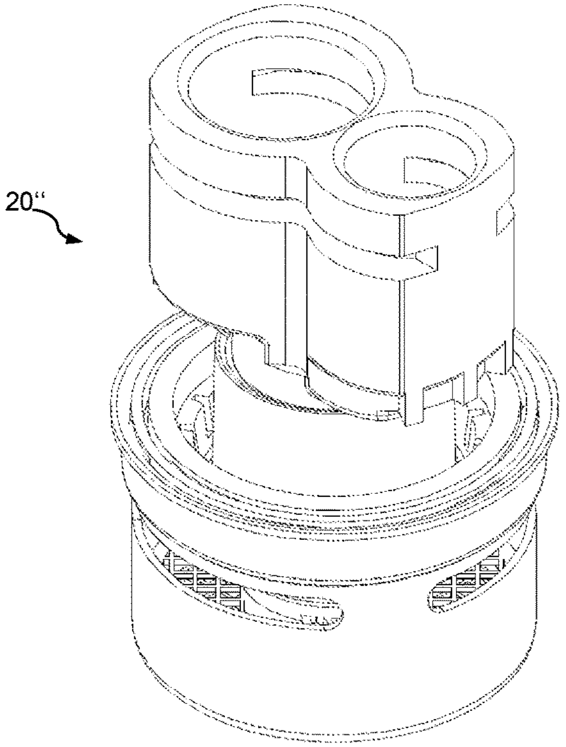
Figure 5E:
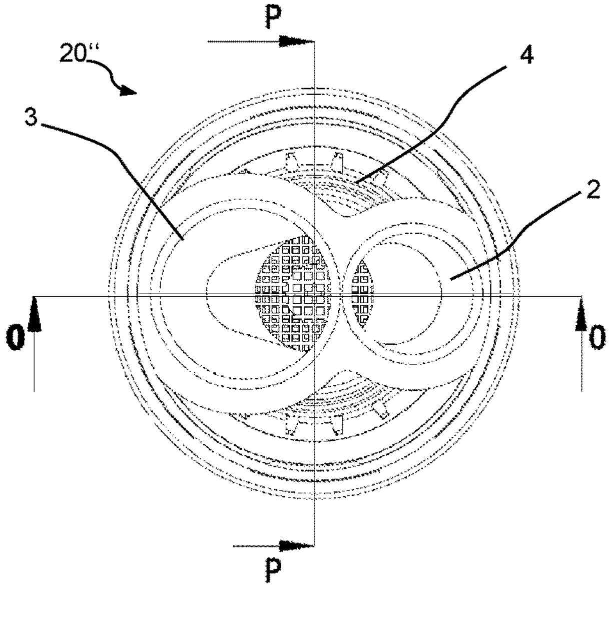
Figure 5F:
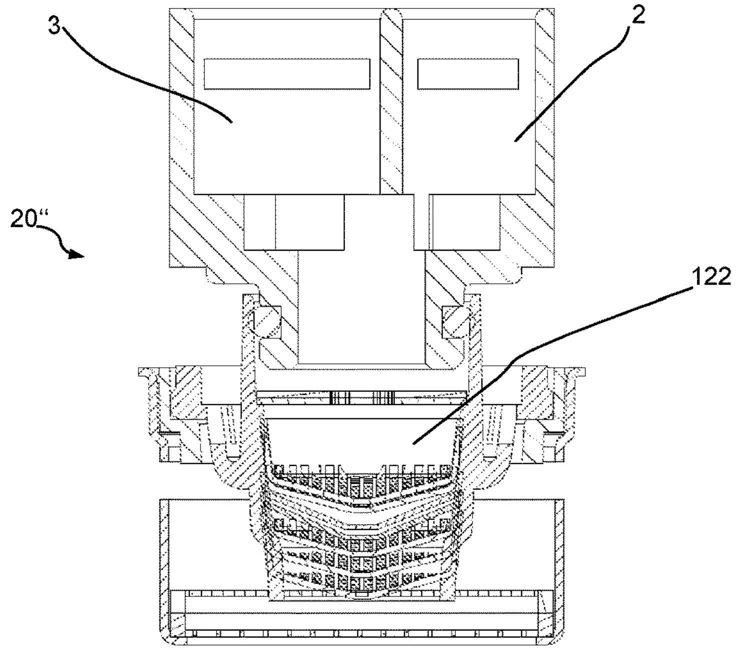
Figure 5G:
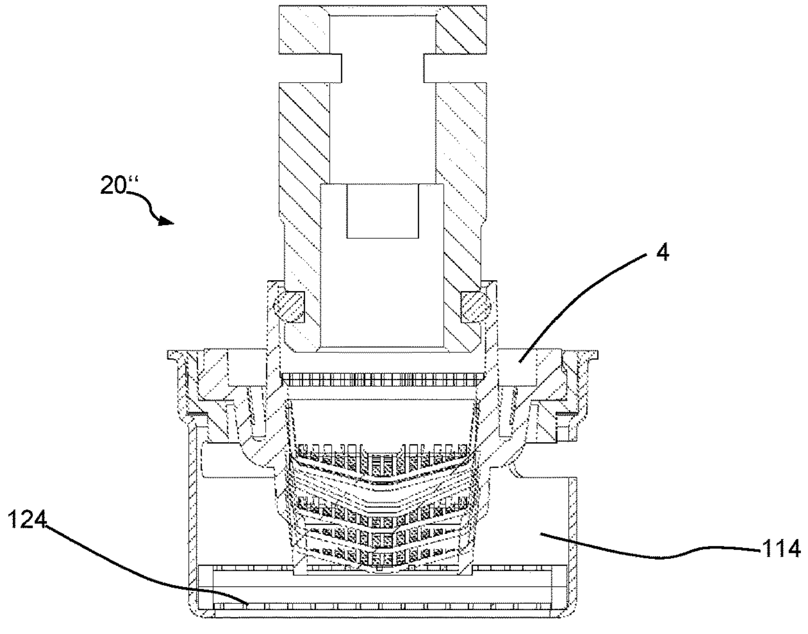
Figure 6A:
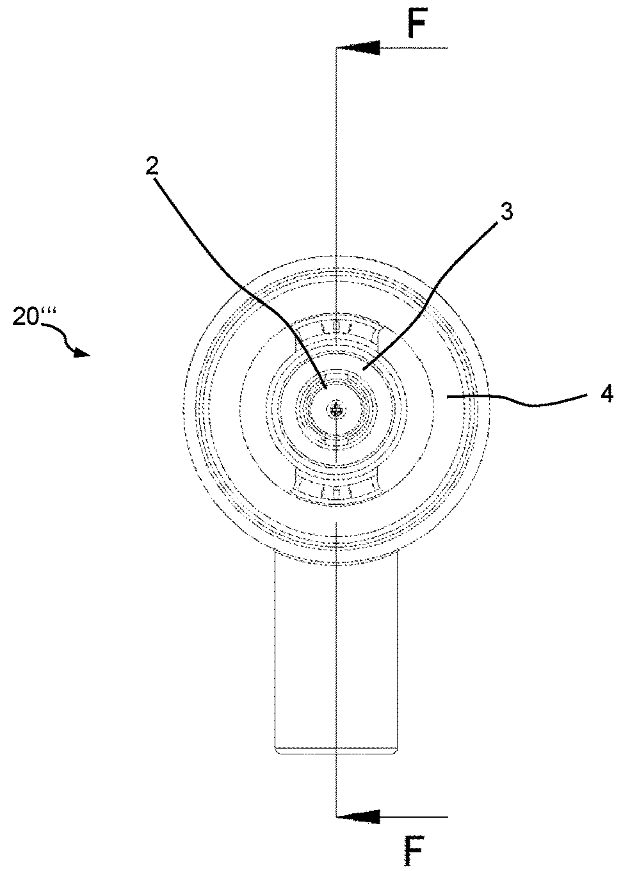
Figure 6B:
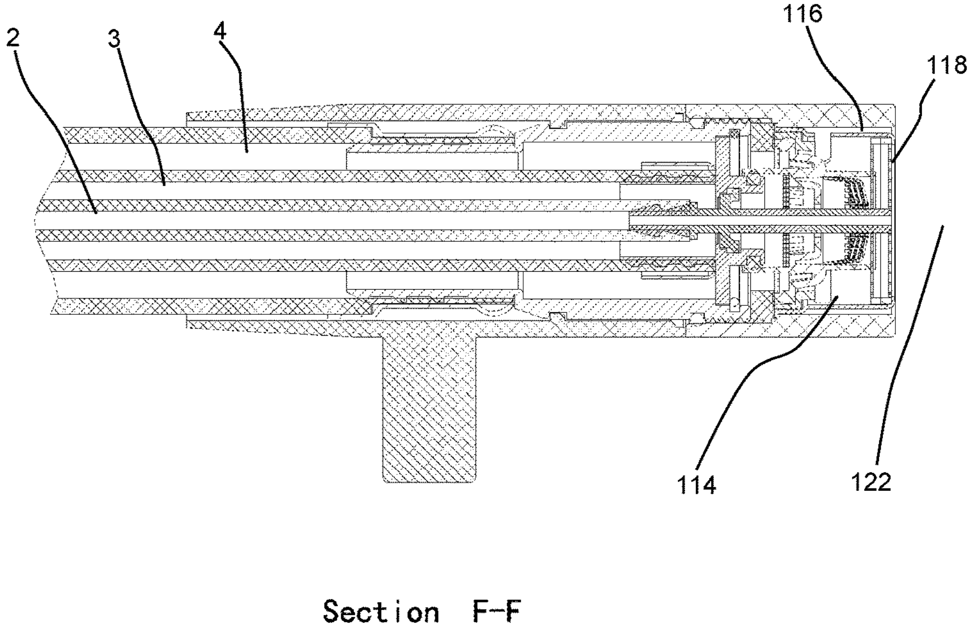
Figure 6C:
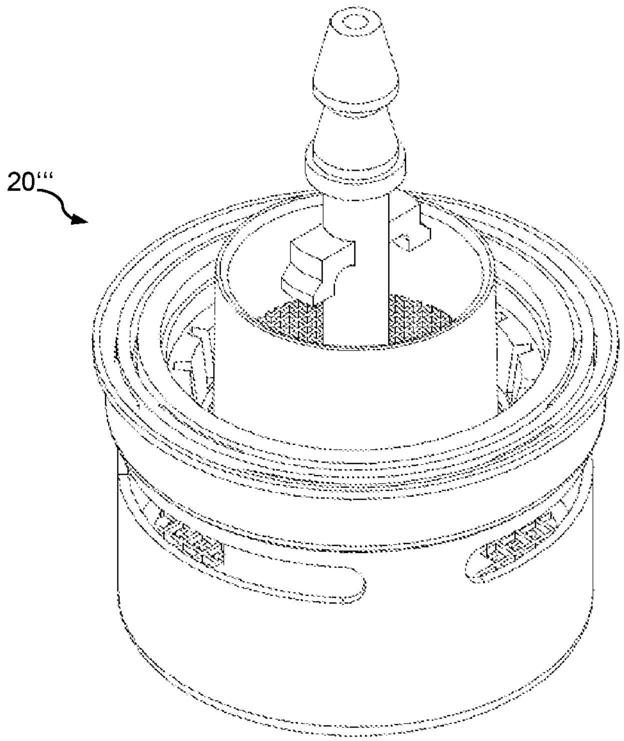
Figure 6D:
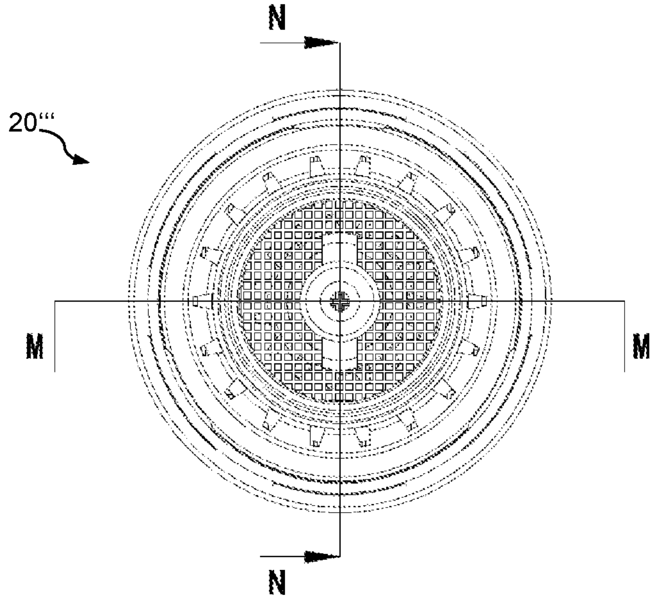
Figure 6E:
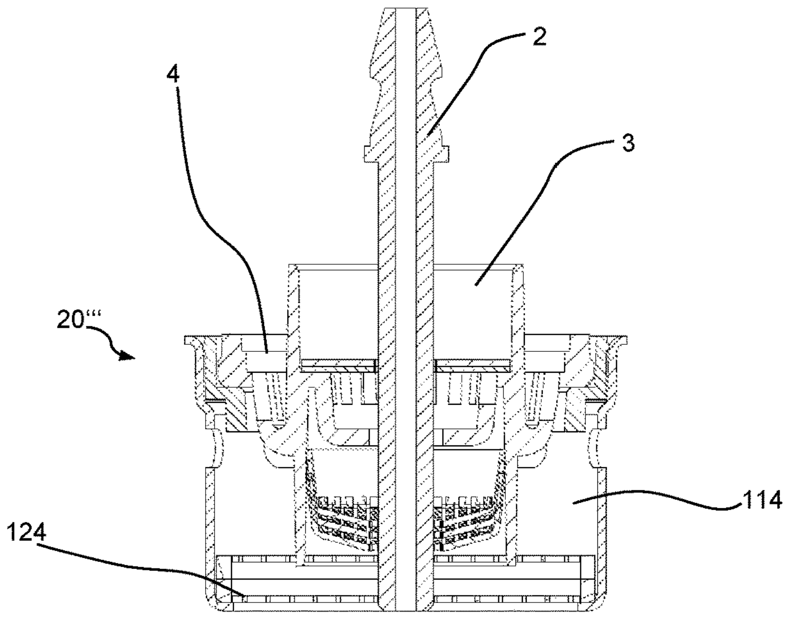
Figure 6F:
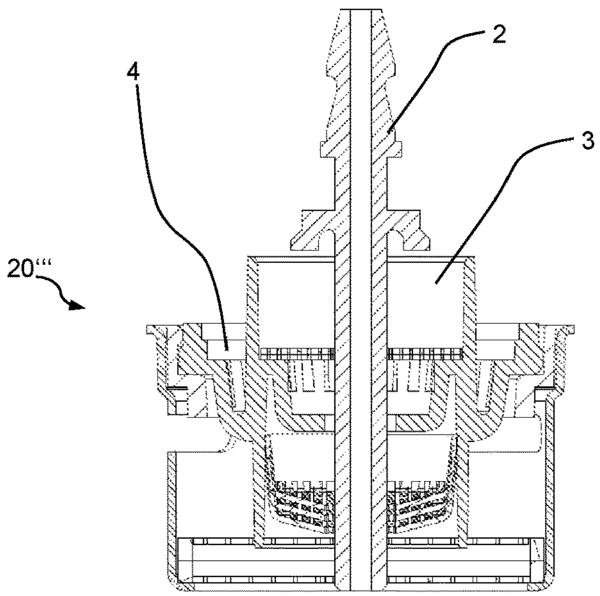

FIG. 4*c* is a perspective view of the mixing device of FIGS. 4*a* and 4*b* in a disassembled configuration, FIG. 4*d* is a top view of the mixing device of FIG. 4*c*, FIG. 4*e* is a cross-sectional view taken along line H-H in FIG. 4*d*, FIG. 4*f* is a cross-sectional view taken along line J-J in FIG. 4*d*, FIG. 5*a* is a top view of an embodiment of a mixing device according to the present invention, FIG. 5*b* is a cross-sectional view taken along line D-D in FIG. 5*a*, FIG. 5*c* is a cross-sectional view taken along line E-E in FIG. 5*a*, FIG. 5*d* is a perspective view of the mixing device of FIGS. 5*a*-5*c* in a disassembled configuration, FIG. 5*e* is a top view of the mixing device of FIG. 5*d*, FIG. 5*f* is a cross-sectional view taken along line O-O in FIG. 5*e*, FIG. 5*g* is a cross-sectional view taken along line P-P in FIG. 5*e*, FIG. 6*a* is a top view of a mixing device according to an embodiment of the present invention, FIG. 6*b* is a cross-sectional view taken along line F-F in FIG. 6*a*, FIG. 6*c* is a perspective view of the mixing device of FIGS. 6*a* and 6*b* in a disassembled configuration, FIG. 6*d* is a top view of the mixing device of FIG. 6*c*, FIG. 6*e* is a cross-sectional view taken along line M-M in FIG. 6*d*, and FIG. 6*f* is a cross-sectional view taken along line N-N in FIG. 6*d*.

At this point, it is primarily to be noted that identical or similar parts of different embodiments of the present invention are denoted with identical or similar reference numbers throughout the following description. It is also noted that the following explanations with respect to the embodiments described are not meant to delimit the scope of the present invention in any manner. Furthermore, if applicable, features, effects and advantages that are described for a specific embodiment may be transferred to another embodiment.

FIG. 1*a* presents a first embodiment of a mixing tap system 1 connected to a supply system that is configured to deliver hot and cold line-water from the main 21, to deliver drinking liquids from drinking liquid supplying devices 6, 7, 8 such as chilled water, sparkling water, boiling water, and/or filtered water at ambient temperature, and to deliver additives from additive liquid supplying devices 9, 10, 11. The supplying devices 6-11 may be resupplied via the main 21 or may be resupplied via an inlet provided at the supplying devices 6-11. Although the devices 6-11 are denoted as "supplying" devices, the devices may not only be adapted to supply a liquid directly but may also be adapted to store a specific liquid in a respective vessel, e.g. water may be stored from line water and then chilled or heated to a desired temperature.

The mixing tap system 1 according to this embodiment comprises a tap with a tap base 25, a tap housing and a tap spout 19, wherein first to fourth inlet conduits 21, 22, 23, 24 are connected to the tap base 25, wherein the first conduit 24 is configured to supply at least one drinking liquid to the tap base 25 from at least one drinking liquid supplying device 6, 7, 8, the second conduit 23 is configured to supply at least one additive liquid to the tap base 25 from at least one additive liquid supplying device 9, 10, 11, the third conduit 21 is configured to supply non-filtered cold line water to the tap base 25, the fourth conduit 22 is configured to supply non-filtered hot line water to the tap base 25.

The mixing tap system 1 here further comprises a first electronic operating member 13 as a user interface configured to select and operate at least one electronic valve 30, 30', 30" and/or at least one pump 31, 31', 31" positioned be-tween the tap base 25 and the supplying devices 6, 7, 8, 9, 10, 11 for opening and closing any individual selected valve 30, 30', 30" and/or operating any individual selected pump 31, 31', 31" for delivering at least one of the drinking liquids and/or at least one of the additive liquids.

A first mixing device that is arranged at the tap base 25 is configured to mix hot and cold line water for obtaining line water at a desired temperature, wherein the mixing arrangement is operated by a second, in this case mechanical, operating member 14 configured to deliver hot line water, cold line water, or the obtained mixture of hot and cold line water.

The tap spout 19 of this embodiment comprises separated first, second, and third internal conduits 2, 3, 4 for delivering the isolated additive liquids, the drinking liquids, and line water at the desired temperature.

The tap of the system 1 is mounted on a kitchen countertop 12. The first operating member 13 is mounted on the left side of the tap base 25. The first operating member 13 according to the shown embodiment may be rotated around a rotation axis and pressed in the axial direction of the rotation axis for controlling the outflow of the liquids supplied to the tap. One or more types of the stored liquids may be selected by rotating the first operating member 13, wherein at least one rotational position of the first operating member 13 is corresponding to a specific liquid, and then pushing the operating member in an axial direction will open at least one valve 30, 30', 30" positioned between the drinking liquid supplying devices 6, 7, 8 and the tap inlet or will activate at least one pump 31, 31', 31" positioned between the additive liquid supplying devices 9, 10, 11 and the tap inlet to deliver the liquids selected.

An exemplary selection of drinking liquids stored in the drinking liquid supplying devices 6, 7, 8 might be one of the following (but not limited to): filtered water, filtered water thermally treated, filtered water at ambient temperature, chilled or boiling water, filtered water mixed with a gas (e.g. carbonated water).

As already stated above, a selection of additive liquids stored in additive liquid supplying devices 9, 10, 11 might be one of the following: flavored liquids, such as fruit or vegetables taste, like lemon taste, orange taste, mint taste, cucumber etc., coffee flavor, tea flavor, alcoholic liquids or liquids mixed with healthy ingredients, such as minerals and vitamin liquids, or other mixtures. Additive liquids may be highly concentrated.

The first operating member 13 is here further configured to perform a selection such that two types of liquids are delivered simultaneously from the connected supplying devices 6-11. For example one of the drinking liquids and one of the additive liquids may be supplied to the tap to mix the two liquids such that a beverage can be delivered to a user of the mixing tap system 1.

The first operating member 13 is electrically connected to a control unit 60. The control unit 60 is configured to control the delivery of the drinking liquids, the additive liquids, and the mixed liquids by opening any of the selected valves 30, 30', 30" and operating/activating any of the selected pumps 31, 31', 31" to supply the liquids to the tap.

In the embodiment shown in FIG. 1*a*, a LED is illuminated in a window 15 when the first operating member 13 is turned/pressed, wherein the light color changes when the first operating member 13 is turned to indicate the current selection of liquid delivery. Each individual LED color is therefore associated with a specific valve or pump (drinking liquid(s) or additive liquid(s)), for instance, light red for filtered hot or boiling water, light blue for filtered chilled water, light green for sparkling water light purple for additive one, etc. By pressing the first operating member 13 once against a return force of the first operating member 13, the chosen liquid(s) is/are delivered. Upon subsequent further turning of the rotary handle (the first operating member 13) the flow rate or delivery time (to control the concentration) of the selected liquid can be adjusted to receive a desired concentration of the liquid mixture. Doing so, the light intensity changes accordingly. Pressing and turning the first operating member 13 again allows a selection of a second type of liquid which may be indicated by a second color. Upon subsequent pressing the first operating member 13 two times the selected valve(s) and pump(s) are opened or operated to deliver the selected liquid(s).

The second operating member 14 is mounted on the right side of the tap base 25 and is configured to be rotated to adjust the temperature of the line water delivered from the first mixing device to the second mixing device 20. When second operating member 14 is pulled/tilted outwards, a flow of line water is allowed to pass the first mixing device and is supplied to the second mixing device 20. By rotating the second operating member 14, the temperature of the mixture of cold and hot line water is adjusted.

In another embodiment option (not shown) first and second operating members 13, 14 may also be placed externally of the tap, for example attached to a countertop or worktop, disconnected from the tap, and remotely communicate with the system operating the electronic elements either wired or in wireless communication. In an alternative embodiment (not shown) first and second operating members 13, 14 may be realized by touch panel control.

The hot line water conduit 22 is branched off from the water main line 21, as it is shown on the right side in FIG. 1*a*. To generate hot line water, a boiler 5 is arranged at the hot line water conduit 22. The boiler may be configured to heat water that is passing through the boiler and/or it may be adapted to store water at a predetermined water temperature.

Also, a drinking liquid supply line is branched off from the water main line 21, as it is shown on the right side in FIG. 1*a*, as well. The drinking liquid supply line passes a filtering device 32 that is adapted to remove debris, foreign substances and the like and/or is adapted to change the water hardness of the line water. The water treated by the filtering device 32 is then supplied to the drinking liquid supply devices 6, 7, 8.

According to the embodiment shown in FIGS. 1*a* to 1*c*, the mixing tap system 1 comprises first to third internal isolated conduits 2, 3, 4 for separately delivering liquids supplied to/from the tap base 25. With reference to FIGS. 1*b* and 1*c*, the first internal conduit 2 is located in the center of the tap spout 19 and. A second internal conduit 3 is arranged in a manner surrounding the first internal conduit 2, wherein the second internal conduit 3 is surrounded by a wall of the tap spout 19. This wall may be of a metal material. The first internal conduit 2 and a second internal conduit 3 may be built by a plastic hose or metal pipe. In other words, the arrangement of the first to third internal conduits 2, 3, 4 is a concentric arrangement.

Here, the first internal conduit 2 fluidly connects the second conduit 23 (the additive liquid supplying conduit 23 that is supplying additive liquid(s) from the additive liquid supplying devices 9, 10, 11) with the second mixing device 20 (cf. Detail G of FIG. 1*b*) such that additive liquid(s) are provided over the first internal conduit 2 to the second mixing device 20. The second internal conduit 3 fluidly connects the first conduit 24 (the drinking liquid supplying conduit 24 that is supplying drinking liquid(s) from the drinking liquid supplying devices 6, 7, 8) with the second mixing device 20 (cf. Detail G of FIG. 1*b*) such that drinking liquid(s) are provided over the second internal conduit 3 to the second mixing device 20. The third internal conduit 4 fluidly connects the first mixing device with the second mixing device 20 (cf. Detail G of FIG. 1*b*) such that a desired mixture of hot and cold line water is provided over the third internal conduit 4 to the second mixing device 20.

At the end of the first and second internal conduits 2, 3, a first mixing space 122 is arranged in which the drinking liquid(s) and the additive liquid(s) are mixed and are delivered via a spout outlet 118 of the second mixing device 20, for example, to a cup of a user.

As can further be seen in FIG. 1*b*, the mixed line water supplied via the internal conduit 4 is bypassing the first mixing space 122 and is delivered through the spout outlet 118 unmixed. A second mixing space 114 is arranged in the second mixing device 20 to mix air into the liquid(s) provided through the first to third internal conduits 2, 3, 4. In the shown example, the second mixing space 114 is adapted to only mix air into the mixed line water supplied over the third internal conduit 4 bypassing the first mixing space 122. Of course, the second mixing space 114 may also be adapted to mix air into other liquids, e.g. the drinking liquids. For this purpose, it may be beneficial to divide the second mixing space 114 into two subspaces such that mixed or single dinking/additive liquid(s) and line water do not mix in the second mixing space 114 unintentionally.

Mesh layers 124 may be provided at the spout outlet 118 to even a flow of liquid(s) out of the second mixing device 20. The mesh layers 124 are surrounded by an air inlet 116 that is configured as an annular space such that air is mixed into the liquid in the mixing device 20.

In the following further embodiments of the present invention are explained with reference to the drawing, wherein all features, effects and advantages that are described for a specific embodiment may be transferred to another embodiment, if applicable. Thus, only differences of the other embodiments to the first embodiment are now described.

FIGS. 2*a* to 2*c* illustrate another embodiment of a mixing tap system 1' comprising a second mixing device 20'. The tap of FIGS. 2*a* to 2*c* is configured to deliver drinking liquids, additive liquids, or a mixture of the two types of liquids for delivering beverages. Unlike the tap presented in FIGS. 1*a* to 1*c*, the mixing tap system 1' lacks the option to deliver main water. This embodiment of the mixing tap system 1' may be used when a user wishes to use two separated taps, one for delivering line water (not shown) and the other for delivering the drinking liquids, the additive liquids, and the mixture of the two types for providing beverages.

As a consequence, only two internal conduits 2 and 4 are running through the tap spout 19.

Nonetheless, the water main line 21 is connected to the drinking liquid supplying devices 6, 7, 8 to refill them and to provide the water pressure, as mentioned above.

FIGS. 3*a* and 3*b* illustrate another embodiment of a mixing tap system comprising the second mixing device 20, wherein the mixing tap system 1" is a so-called "pull-out" tap that allows a user to pull out the tap spout end (including the second mixing device 20) from the tap spout 19 (see also FIGS. 4*a* to 4*f*). Therefore, the third internal conduit 4 is not defined by the wall of the tap spout 19 but is defined by a flexible hose 80 inserted into the tap spout 19. All internal conduits 2, 3, 4 can be pulled out of the spout. An inlet connection to a pull out pipe entry 210 (also referred to as a "manifold" below) is positioned at the entry of the pipes. The manifold 210 comprises three inlets 223, 224, 225 arranged in parallel for receiving mixed line water at inlet 225 (connected to the third internal conduit 4), drinking liquids at inlet 224 (connected to the second internal conduit 3), and additive liquids at inlet 223 (connected to the first internal conduit 2). The line water is delivered to the tap via tap entry 221 and 222 and, after mixing in the first mixing device, the mixed water is delivered to the inlet 225 positioned in the manifold 210.

The embodiment of FIGS. 3*a* and 3*b* is shown in greater detail in FIGS. 4*a* to 4*f*, wherein FIGS. 4*a* to 4*f* mainly concentrate on the second mixing device 20 of a pull-out-tap, as described above.

FIGS. 5*a* to 5*c* show details of another embodiment of a second mixing device 20". Here, the first and second internal conduits 2 and 3 are running in parallel through the tap spout 19, wherein the third internal conduit 4 is defined by a flexible hose 4, since the shown embodiment is also a pull-out-tap. Hence, the first mixing space 122 of the second mixing device 20" has two parallel inlets for the first and second internal conduits 2, 3.

FIGS. 5*d* to 5*g* show further perspectives and cut-outs of the second mixing device 20" having two parallel inlets.

Finally, in FIGS. 6*a* to 6*f*, another embodiment of a second mixing device 20'" is shown, wherein the associated mixing tap system is also a pull-out-tap. In general, the embodiment of FIGS. 6*a* to 6*f* is very similar to the embodiment of FIGS. 4*a* to 4*f* The main difference can be seen in the ending of the first internal conduit 2 which is not opening into a first mixing space 122 but is extended all the way to the spout outlet 118. Consequently, the additive liquid(s) and the drinking liquid(s) do not mix within the second mixing device 20'" but mix in a first mixing space 122 that is arranged outside the second mixing device 20'". In other words, the liquids mix after they have left the second mixing device 20'" via the spout outlet 118.

This makes it possible to deliver a very small amount of the additive liquid(s), e.g. just a few drops, via the spout outlet 118, since this little amount of additive liquid(s) may otherwise be withheld in the first mixing space 122 due to adhesive forces. The first internal conduit 2 here even penetrates the mesh layers 124 to avoid such an adhesion. This is especially advantageous for highly concentrated additive liquid(s).

The invention claimed is:

1. A mixing tap system, comprising:

a tap with a tap base, a tap housing and a tap spout, wherein at least two fluidly separated inlet conduits are connected to the tap base, wherein a first inlet conduit of the at least two inlet conduits is configured to supply a drinking liquid to the tap base from a drinking liquid supplying device, and wherein a second inlet conduit of the at least two inlet conduits is configured to supply an additive liquid to the tap base from an additive liquid supplying device;

a first operating member configured to operate a first valve positioned between the tap base and the drinking liquid supplying device and a second valve positioned between the tap base and the additive liquid supplying device for opening and closing the first valve or the second valve for delivering at least one of the drinking liquid or the additive liquid;

wherein the tap spout comprises at least a first internal conduit and a second internal conduit running within the tap that are fluidly separated from each other for separately delivering the additive liquid and the drinking liquid;

a mixing device within the tap spout, the mixing device comprising a first inlet connected to the first internal conduit and configured to receive the drinking liquid and a second inlet connected to the second internal conduit and configured to receive the additive liquid;

a tap outlet, wherein the first inlet and the second inlet are adapted to deliver the drinking liquid and the additive liquid separately at the same time such that the drinking liquid and the additive liquid mix at the tap outlet;

wherein the mixing device is arranged in the vicinity of the tap outlet;

wherein the first internal conduit and the second internal conduit are flexible and run from the tap base through the tap to the mixing device in a concentric manner;

wherein the first internal conduit is inside the second internal conduit; and wherein the first internal conduit is fixed with respect to the spout and terminates at a tip of the spout with a nozzle.

2. The mixing tap system of claim 1, further comprising:

a third inlet conduit connected to the tap base, wherein the third inlet conduit is configured to supply to the tap base hot line water or cold line water or a mixture of hot and cold line water mixed by a further mixing device that is configured to mix the hot and cold line water for obtaining line water at a desired temperature, wherein the further mixing device is operated by a second operating member configured to deliver hot line water, cold line water, or the mixture of hot and cold line water; and wherein the tap spout comprises a third internal conduit running within the tap that is fluidly separated from the first internal conduit and the second internal conduit for delivering the hot line water or the cold line water or the mixture of hot and cold line water.

3. The mixing tap system of claim 1, further comprising:

a third inlet conduit connected to the tap base, wherein the third inlet conduit is configured to supply to the tap base hot line water;

a fourth inlet conduit connected to the tap base, wherein the fourth inlet conduit is configured to supply to the tap base cold line water; and a further mixing device that is configured to mix hot and cold line water for obtaining line water at a desired temperature, wherein the further mixing device is operated by a second operating member configured to deliver the hot line water, the cold line water, or a mixture of hot and cold line water, wherein the mixture of hot and cold line water is delivered to the further mixing device via a third internal conduit running within the tap that is fluidly separated from the first internal conduit and the second internal conduit-.

4. The mixing tap system of claim 2, wherein the further mixing device is positioned in or at the tap base.

5. The mixing tap system of claim 1, further comprising a control unit electrically connected to the first operating member and configured to control operation of the first operating member so as to control a concentration of a mixture of the drinking liquid and the additive liquid delivered by controlling the flow rate or volume amount of each of the drinking liquid and the additive liquid.

6. The mixing tap system of claim 1, wherein the first internal conduit is capable of being pulled out with respect to the spout such that a hose end of the first internal conduit is extended out the spout tip.

7. The mixing tap system of claim 6, wherein the first internal conduit is provided with a ballast element for pulling the first internal conduit back to its normal position inside the spout after having pulled it out from the spout and having left it free.

8. The mixing tap system of claim 1, further comprising a second operating unit configured to operate a first pump positioned between the tap base and the drinking liquid supplying device and a second pump positioned between the tap base and the additive liquid supplying device for delivering at least one of the drinking liquid or the additive liquid.

9. The mixing tap system of claim 8, wherein the second pump for delivering the additive liquid is configured to return any additive liquid remaining in the second inlet conduit back to the additive liquid supplying device.

* * * * *